(12) United States Patent
Albero et al.

(10) Patent No.: US 12,218,919 B2
(45) Date of Patent: Feb. 4, 2025

(54) DYNAMIC STEGANOGRAPHIC EMBEDDINGS FOR MESSAGE THREAT DETECTION

(71) Applicant: Bank of America Corporation, Charlotte, NC (US)

(72) Inventors: George Albero, Charlotte, NC (US); Maharaj Mukherjee, Poughkeepsie, NY (US); Elijah Clark, Charlotte, NC (US); Benjamin Moores, Ventura, CA (US)

(73) Assignee: Bank of America Corporation, Charlotte, NC (US)

( * ) Notice: Subject to any disclaimer, the term of this patent is extended or adjusted under 35 U.S.C. 154(b) by 246 days.

(21) Appl. No.: 18/070,012

(22) Filed: Nov. 28, 2022

(65) Prior Publication Data

US 2024/0179135 A1    May 30, 2024

(51) Int. Cl.
*H04L 9/40*    (2022.01)

(52) U.S. Cl.
CPC ...... *H04L 63/0428* (2013.01); *H04L 63/1416* (2013.01)

(58) Field of Classification Search
None
See application file for complete search history.

(56) References Cited

U.S. PATENT DOCUMENTS

| | | |
|---|---|---|
| 11,507,675 B2 | 11/2022 | Riley et al. |
| 11,507,948 B2 | 11/2022 | DeRosa-Grund |
| 11,507,950 B2 | 11/2022 | Ozvat et al. |
| 11,509,535 B2 | 11/2022 | Vu et al. |
| 11,509,603 B2 | 11/2022 | Andrews et al. |
| 11,509,667 B2 | 11/2022 | Hines et al. |
| 11,509,680 B2 | 11/2022 | Steimberg et al. |
| 11,509,682 B1 | 11/2022 | Paget et al. |
| 11,509,683 B2 | 11/2022 | Vela et al. |
| 11,509,686 B2 | 11/2022 | Luo et al. |
| 11,509,689 B2 | 11/2022 | Weber et al. |
| 11,509,691 B2 | 11/2022 | Chen Kaidi |
| 11,509,692 B2 | 11/2022 | Cohen et al. |
| 11,510,060 B2 | 11/2022 | Wang et al. |
| 2022/0366026 A1 | 11/2022 | Gordon et al. |
| 2022/0366039 A1 | 11/2022 | Hen et al. |
| 2022/0366332 A1 | 11/2022 | Duessel |
| 2022/0368689 A1 | 11/2022 | Ben-Noon et al. |

(Continued)

*Primary Examiner* — Cai Y Chen
(74) *Attorney, Agent, or Firm* — Banner & Witcoff, Ltd.

(57) ABSTRACT

Aspects of the disclosure relate to electronic messaging security. A computing platform may push, to a client device, an electronic messaging plugin configured to validate steganographic modifications, embedded in electronic messages by the computing platform. The computing platform may intercept an electronic message directed to the client device. The computing platform may generate a steganographic modification to the electronic message. The computing platform may embed, in the electronic message, the steganographic modification, resulting in a modified electronic message. The computing platform may send, to the client device, the modified electronic message, where the client device may configured to validate, using the electronic messaging plugin, the steganographic modification prior to launching the modified electronic message at the client device.

20 Claims, 13 Drawing Sheets

(56) References Cited

U.S. PATENT DOCUMENTS

2022/0368699 A1  11/2022  Thomson
2022/0368726 A1  11/2022  Balasubramaniam et al.
2024/0028727 A1* 1/2024  Murray ................. G06T 1/0021

* cited by examiner

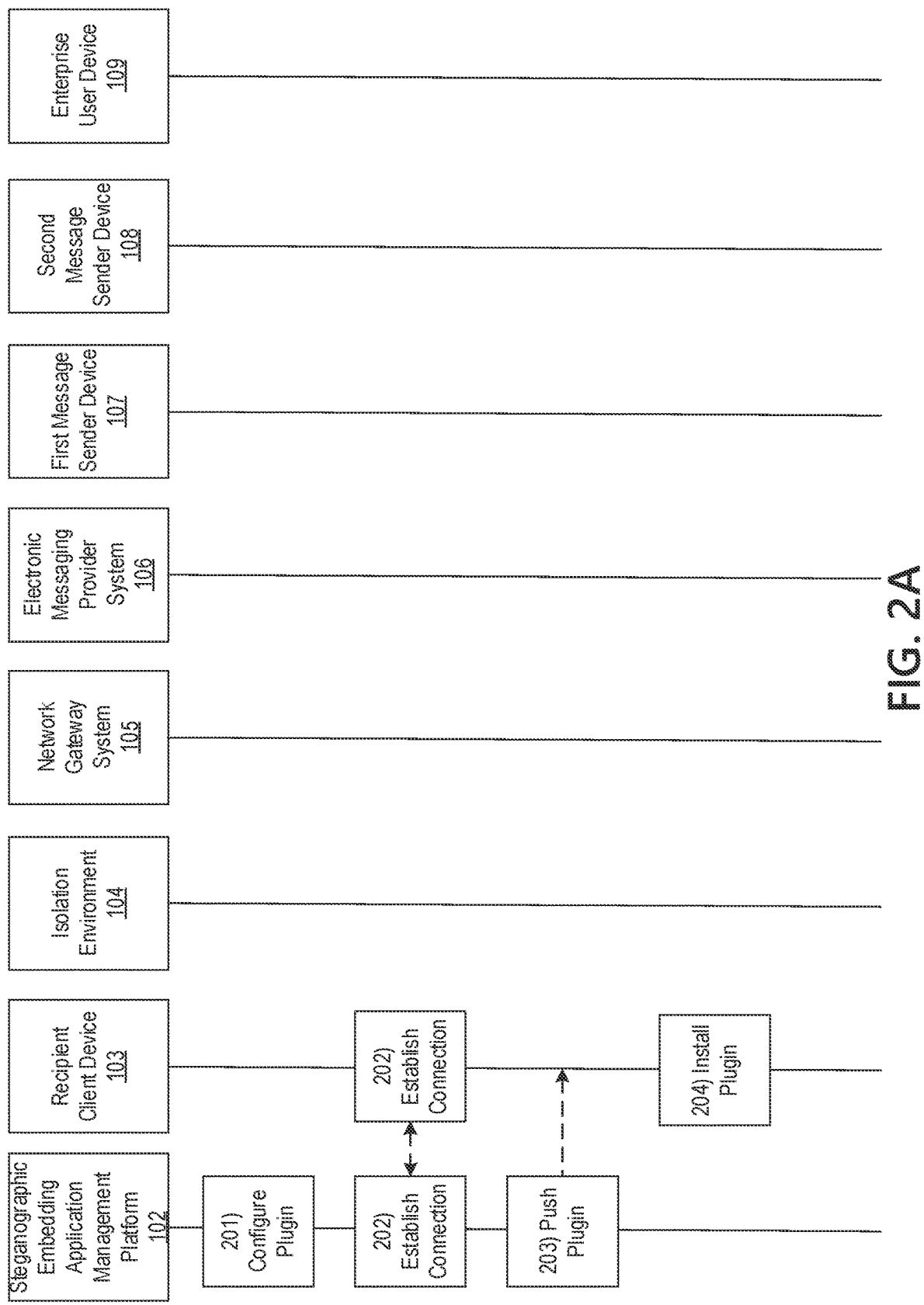

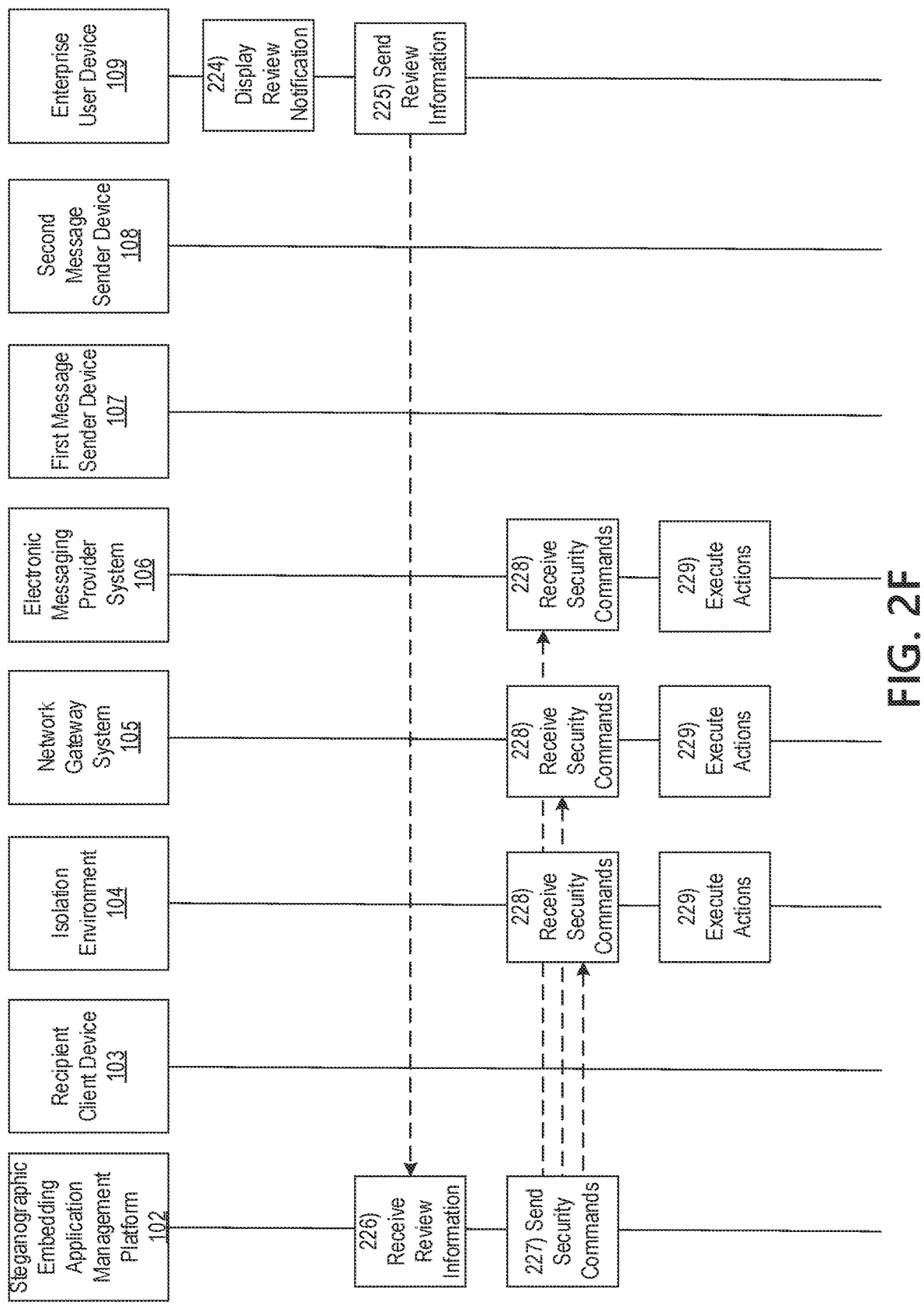

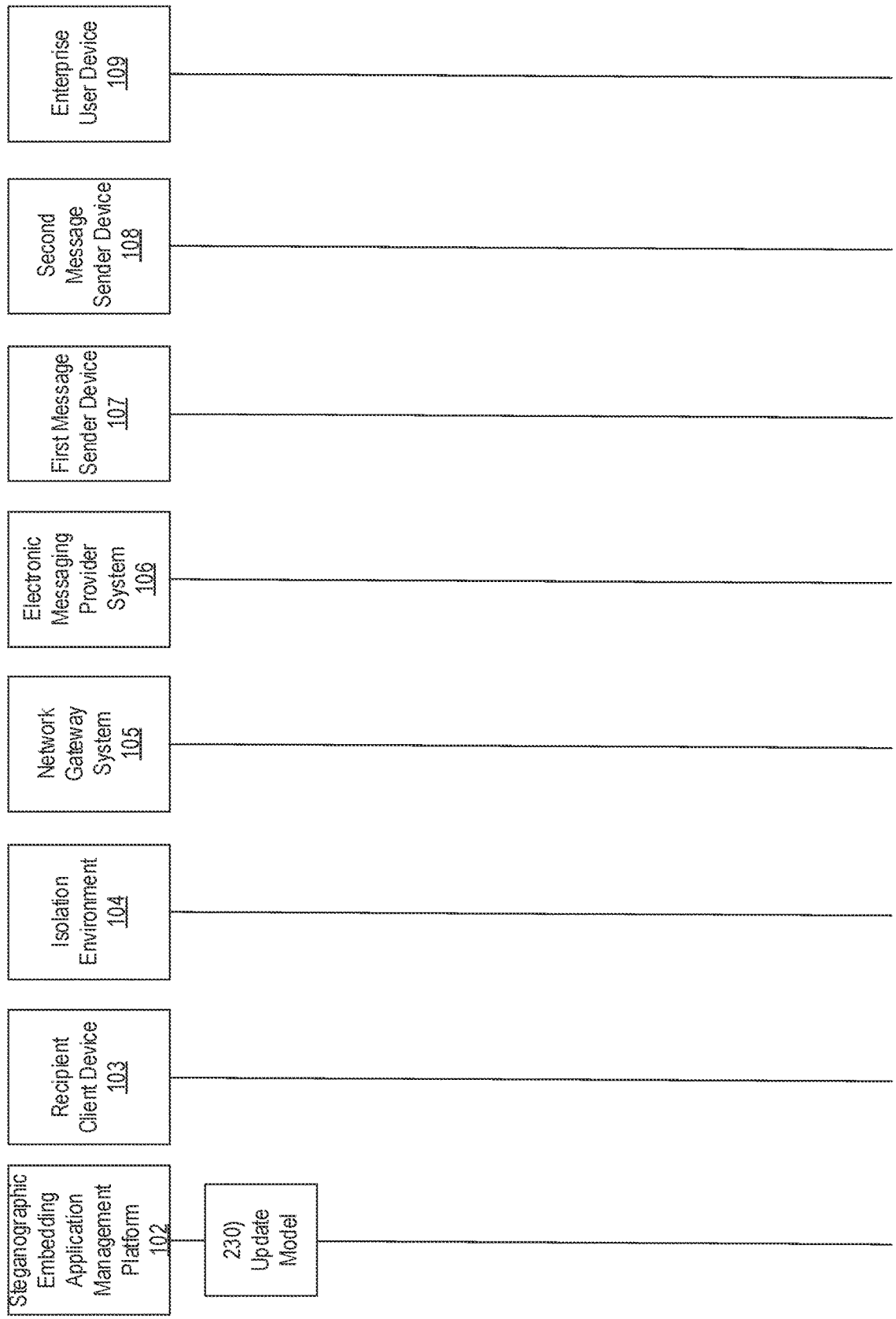

DYNAMIC STEGANOGRAPHIC EMBEDDINGS FOR MESSAGE THREAT DETECTION

BACKGROUND

Aspects of the disclosure relate to electronic messaging security. In some instances, phishing content and/or malware may be embedded into electronic messages. To identify such malicious content, analysis may be performed to identify malicious senders and/or other information, which may then be stored. Once stored, this information may then be used to flag malicious content in newly received messages. Such a method, however, necessarily creates a time gap between when the information is updated and various messages are received. As a result, certain malicious content may remain undetected until it has reached a recipient device and inflicted damage. Accordingly, it may be important to improve the efficacy of phishing and/or malware detection in electronic messages.

SUMMARY

Aspects of the disclosure provide effective, efficient, scalable, and convenient technical solutions that address and overcome the technical problems associated with information security. In accordance with one or more embodiments of the disclosure, a computing platform comprising at least one processor, a communication interface, and memory storing computer-readable instructions may push, to a client device, an electronic messaging plugin configured to validate steganographic modifications, embedded in electronic messages by the computing platform. The computing platform may intercept an electronic message directed to the client device. The computing platform may generate a steganographic modification to the electronic message, which may include generating a modification of a different type than a previously generated steganographic modification. The computing platform may embed, in the electronic message, the steganographic modification, resulting in a modified electronic message, which may include embedding the steganographic modification in a location of the electronic message different than a location in which the previously generated steganographic modification was embedded in a previous message. The computing platform may send, to the client device, the modified electronic message, where the client device may be configured to validate, using the electronic messaging plugin, the steganographic modification prior to launching the modified electronic message at the client device.

In one or more instances, the electronic message may be intercepted from a computing device of an organization common between the computing platform and the computing device. In one or more instances, the steganographic modification may correspond to a modification type, and the modification type may be one or more of: an image, text, an animation, a timestamp, or a logo.

In one or more examples, the steganographic modification may include different characters than the previously generated steganographic modification. In one or more examples, the computing platform may store the steganographic modification, where the electronic messaging plugin may be configured to access the stored steganographic modification to perform the validation.

In one or more instances, the computing platform may train, using historical electronic messages, a machine learning model to identify whether or not the electronic messages comprise malicious messages, where generating the steganographic modification may be in response to identifying, using the machine learning model, that the electronic message does not comprise a malicious message. In one or more instances, the computing platform may receive, from the client device and via the electronic messaging plugin, a notification that the steganographic modification was not validated. The computing platform may send one or more network security commands directing one or more computing systems to execute network security actions.

In one or more examples, the one or more computing systems may include one or more of: a network gateway system, isolation environment, electronic messaging provider system, and/or other systems, and the one or more actions may include identifying a source of the electronic message, identifying an edit to the steganographic modification, modifying a network routing policy, updating a domain list, and/or other actions. In one or more examples, the computing platform may update, based on the notification that the steganographic modification was not validated, a machine learning model configured to identify whether or not the electronic messages comprise malicious messages. In one or more examples, a link within the electronic message may be obscured based on the failed validation of the steganographic modification.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for improved electronic messaging security in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe an email authenticator to protect brands against phishing and/or other malware attacks. Phishing/malware emails may be a main vector to infiltrate an account or organization. Spoofed emails may result in significant financial losses for organizations.

Accordingly, described herein is a steganography validator that may prevent such infiltration by embedding steganography, which may be opened and scanned by an email add-on. The steganography may correspond to a specific code from the sending organization. If there is not a match, a notification may be sent to a pre-determined organization email and a notification may be sent to the intended recipient. The email itself may be quarantined, and sent to an organizational sandbox for forensic examination to detect possible collusion/insider threats.

The steganography embed may be randomly generated and paired with the email add-on code. Each communication may have its own code. In one embodiment, for mass mailings, the pairing may be time-based such that each copy of said email may have the same pairing if sent within a predetermined amount of time of each other. Beyond that time, new embeds and pairings may occur. In some instances, historical features such as source internet protocol (IP) address, time, text analysis, image analysis, and/or other features may use machine learning to pre-block such emails in the future. In some instances, telltale signs of phishing/malware may be shared with mail tool providers, so that they may be included in third party spam filters.

Figure 1A:
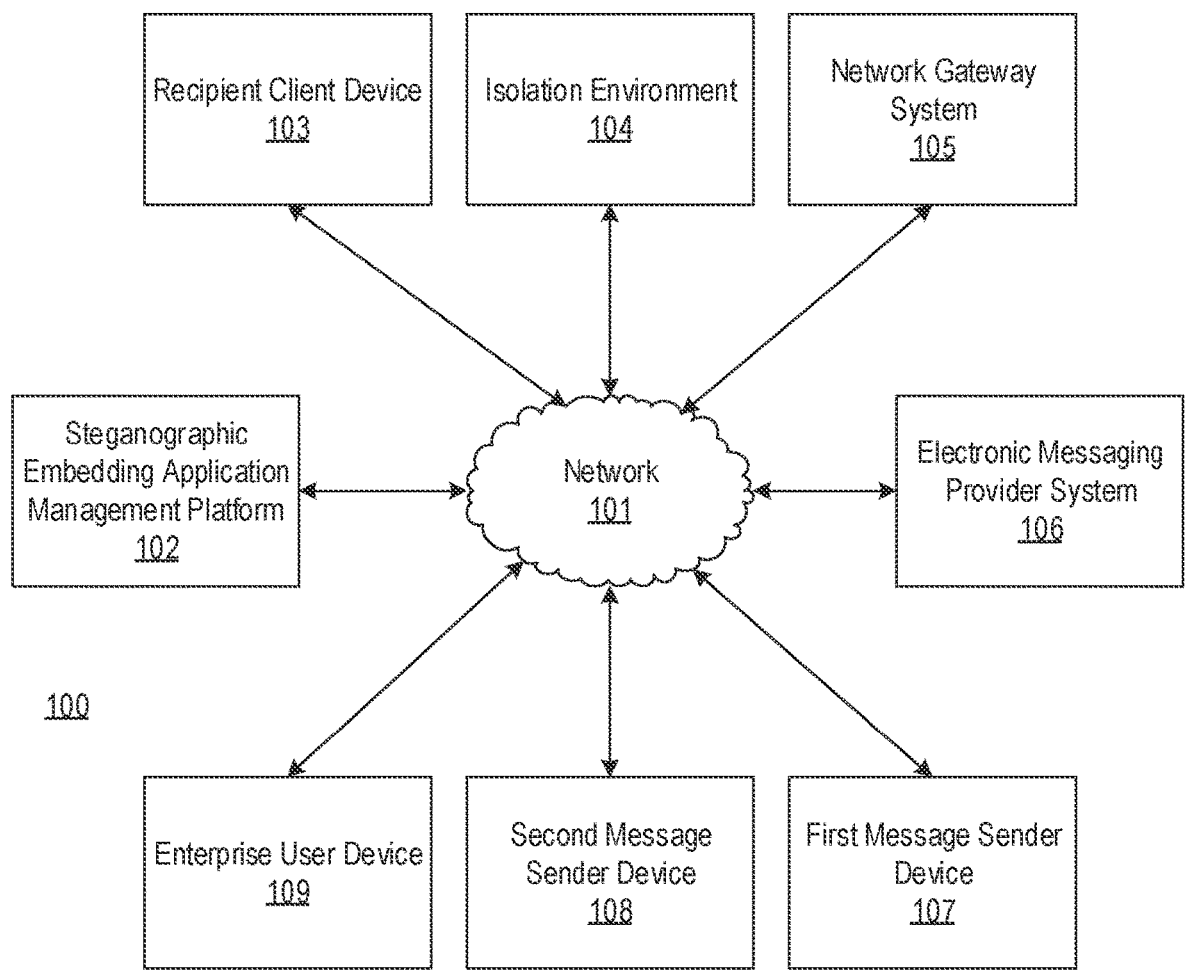
FIGS. 1A-1C depict an illustrative computing environment for improved electronic messaging security in accordance with one or more example embodiments.
Figure 1B:
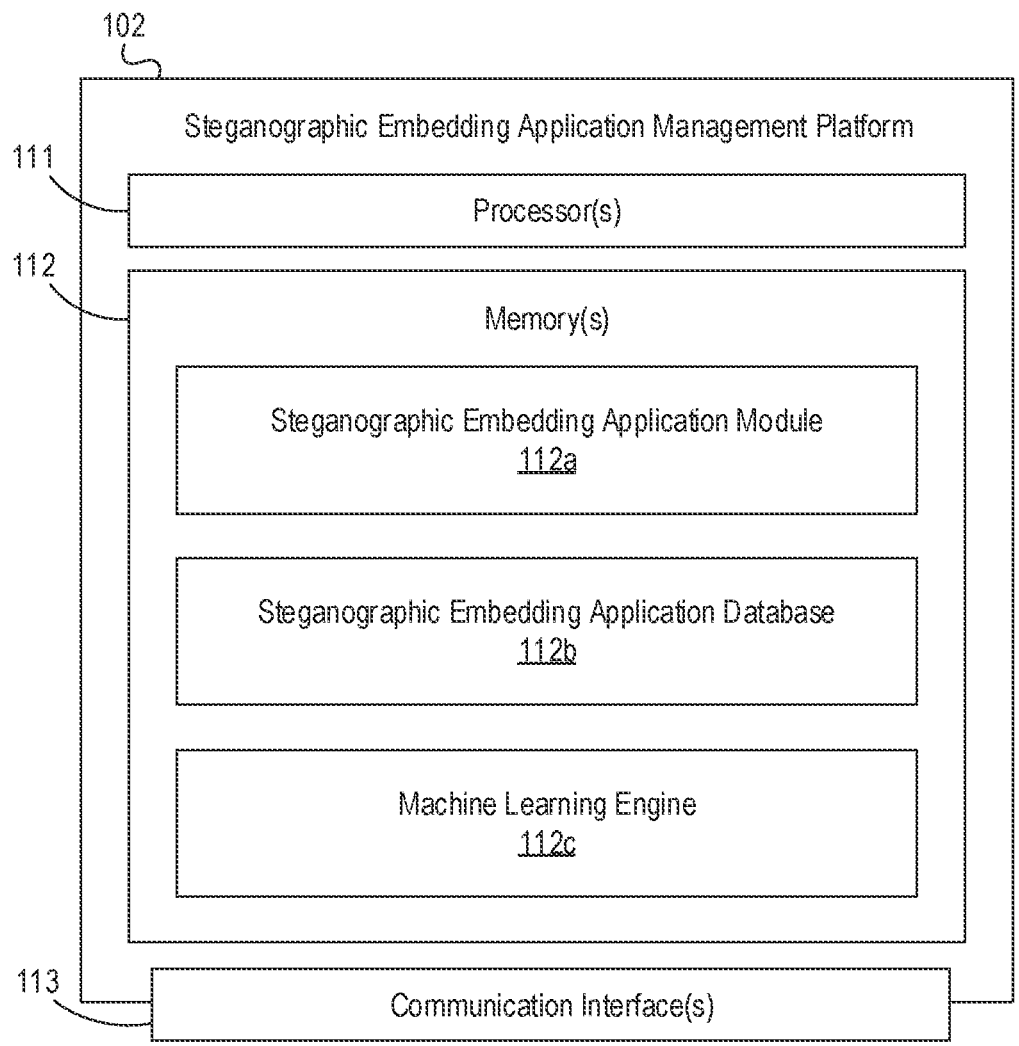
Figure 1C:
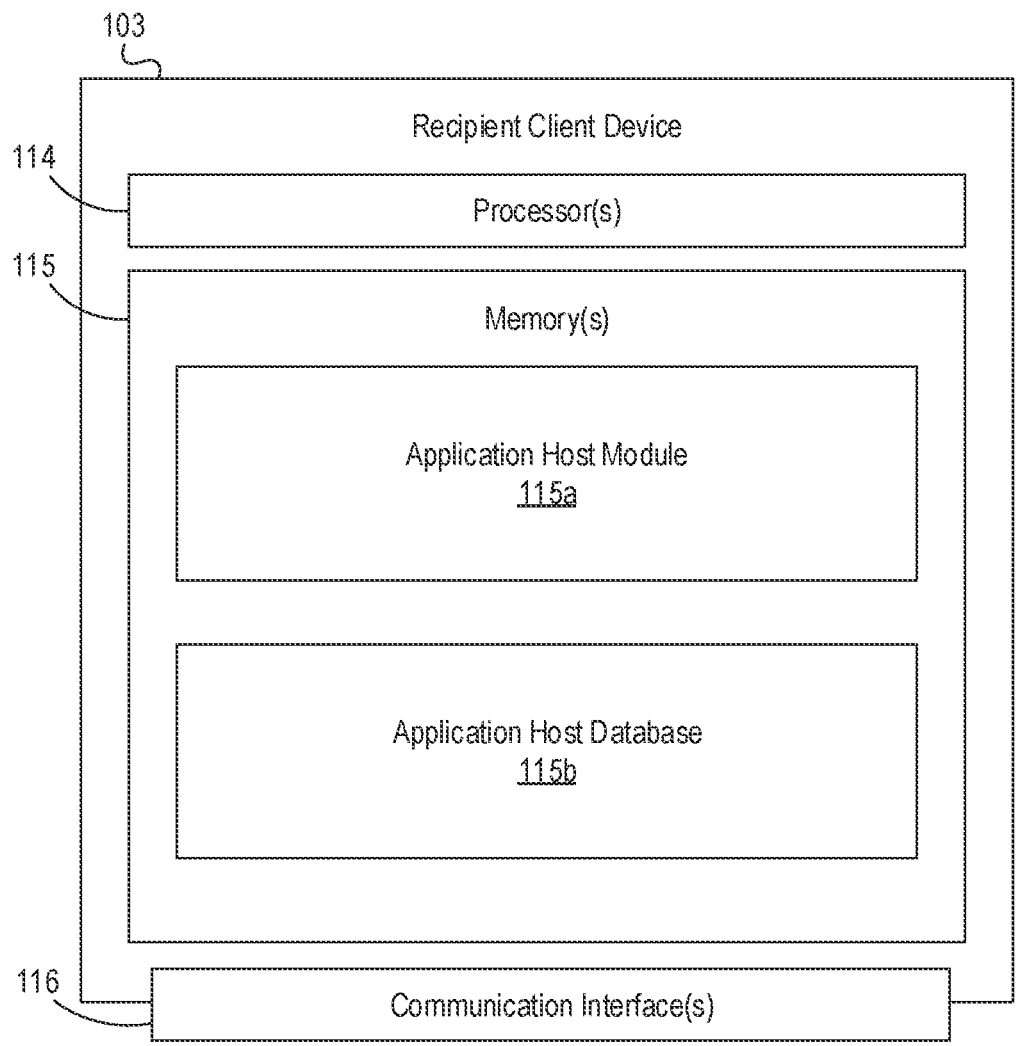

FIGS. 1A-1C depict an illustrative computing environment for improved electronic messaging security in accordance with one or more example embodiments. Referring to FIG. 1A, computing environment 100 may include one or more computer systems. For example, computing environment 100 may include a steganographic embedding application management platform 102, recipient client device 103, isolation environment 104, network gateway system 105, electronic messaging provider system 106, first message sender device 107, second message sender device 108, and enterprise user device 109.

As described further below, steganographic embedding application management platform 102 may be a computer system that includes one or more computing devices (e.g., servers, server blades, or the like) and/or other computer components (e.g., processors, memories, communication interfaces) that may be used to configure an email plugin that may be used to validate steganographic embeddings in electronic messages. For example, the steganographic embedding application management platform 102 may be configured to push the plugin to client devices (e.g., recipient client device 103). The steganographic embedding application management platform 102 may be configured to intercept electronic messages and embed, in the electronic messages, steganography, which may e.g., then be validated using the plugin. In some instances, the steganographic embedding application management platform 102 may be configured to train a threat detection model (e.g., a machine learning model), which may, e.g., be configured to identify electronic messaging threats. In these instances, the steganographic embedding application management platform 102 may use the machine learning model as an initial layer of threat detection (e.g., prior to performing the embedding).

Recipient client device 103 may be a computing device such as a mobile device, tablet, laptop computer, desktop computer, smartphone, and/or other personal computing device configured to support electronic messaging. In some instances, the recipient client device 103 may be configured to install an electronic messaging plugin, configured to validate steganography in received electronic messages. In some instances, the recipient client device 103 may be configured to display one or more graphical user interfaces (e.g., electronic messaging interfaces, or the like).

Isolation environment 104 may be a computer system that includes one or more computing devices (e.g., servers, server blades, or the like) and/or other computer components (e.g., processors, memories, communication interfaces) configured to perform further analysis of an identified malicious message. For example, the isolation environment 104 may be configured to analyze the malicious message in a way that might not allow access of the malicious message to an enterprise network and/or client devices.

Network gateway system 105 may be a computer system that includes one or more computing devices (e.g., servers, server blades, or the like) and/or other computer components (e.g., processors, memories, communication interfaces) configured to apply network routing policies and/or otherwise direct network and/or electronic messaging traffic.

Electronic messaging provider system 106 may be a computer system that includes one or more computing devices (e.g., servers, server blades, or the like) and/or other computer components (e.g., processors, memories, communication interfaces) configured to support an electronic messaging service. In some instances, the electronic messaging provider system 106 may be controlled by an enterprise organization corresponding to the steganographic embedding application management platform 102, or may correspond to a third party organization. In some instances, the electronic messaging provider system 106 may store known threats, and may be configured to apply electronic messaging policies based on the known threats.

First message sender device 107 may be a computing device such as a mobile device, tablet, laptop computer, desktop computer, smartphone, and/or other personal computing device configured to support electronic messaging. In some instances, the first message sender device 107 may be configured to send electronic messages. In some instances, the first message sender device 107 may be configured to display one or more graphical user interfaces (e.g., electronic messaging interfaces, or the like). In some instances, the first message sender device 107 may be operated by an employee of an enterprise organization (e.g., an enterprise corresponding to the steganographic embedding application management platform 102). For purposes of the illustrative event sequence described below, it may be assumed that the first message sender device 107 is operated by a legitimate individual).

Second message sender device 108 may be a computing device such as a mobile device, tablet, laptop computer, desktop computer, smartphone, and/or other personal computing device configured to support electronic messaging. In some instances, the second message sender device 108 may be configured to send electronic messages. In some instances, the second message sender device 108 may be configured to display one or more graphical user interfaces (e.g., electronic messaging interfaces, or the like). For purposes of the illustrative event sequence described below, it may be assumed that the second message sender device 108 is operated by a bad actor.

Enterprise user device 109 may be a computing device such as a mobile device, tablet, laptop computer, desktop computer, smartphone, and/or other personal computing device configured to support electronic messaging. In some instances, the enterprise user device 109 may be configured to receive threat detection notifications and/or otherwise provide manual review capabilities. For example, the enterprise user device 109 may be operated by an employee of an enterprise organization (e.g., an enterprise corresponding to the steganographic embedding application management platform 102), such as a cybersecurity analyst.

Any number of the above described devices/systems may be implemented in the methods described herein without departing from the scope of the disclosure.

Computing environment 100 also may include one or more networks, which may interconnect steganographic embedding application management platform 102, recipient client device 103, isolation environment 104, network gateway system 105, electronic messaging provider system 106, first message sender device 107, second message sender device 108, enterprise user device 109, or the like. For example, computing environment 100 may include a network 101 (which may interconnect, e.g., steganographic embedding application management platform 102, recipient client device 103, isolation environment 104, network gateway system 105, electronic messaging provider system 106, first message sender device 107, second message sender device 108, enterprise user device 109, or the like).

In one or more arrangements, steganographic embedding application management platform 102, recipient client device 103, isolation environment 104, network gateway system 105, electronic messaging provider system 106, first message sender device 107, second message sender device 108, and/or enterprise user device 109 may be any type of computing device capable of sending and/or receiving requests and processing the requests accordingly. For example, steganographic embedding application management platform 102, recipient client device 103, isolation environment 104, network gateway system 105, electronic messaging provider system 106, first message sender device 107, second message sender device 108, enterprise user device 109, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of steganographic embedding application management platform 102, recipient client device 103, isolation environment 104, network gateway system 105, electronic messaging provider system 106, first message sender device 107, second message sender device 108, and/or enterprise user device 109, may, in some instances, be special-purpose computing devices configured to perform specific functions.

Referring to FIG. 1B, steganographic embedding application management platform 102 may include one or more processors 111, memory 112, and communication interface 113. A data bus may interconnect processor 111, memory 112, and communication interface 113. Communication interface 113 may be a network interface configured to support communication between steganographic embedding application management platform 102 and one or more networks (e.g., network 101, or the like). Memory 112 may include one or more program modules having instructions that when executed by processor 111 cause steganographic embedding application management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of steganographic embedding application management platform 102 and/or by different computing devices that may form and/or otherwise make up steganographic embedding application management platform 102. For example, memory 112 may have, host, store, and/or include steganographic embedding application module 112a, steganographic embedding application database 112b, and machine learning engine 112c.

Steganographic embedding application module 112a may have instructions that direct and/or cause steganographic embedding application management platform 102 to execute advanced techniques to provide enhanced threat detection for electronic messaging. Steganographic embedding application database 112b may store information used by steganographic embedding application management module 112a and/or steganographic embedding application management platform 102 to provide enhanced threat detection for electronic messaging, and/or in performing other functions. Machine learning engine 112c may be configured to train, maintain, and/or otherwise refine a machine learning model configured to support threat detection by the steganographic embedding application management platform 102.

Referring to FIG. 1C, recipient client device 103 may include one or more processors 114, memory 115, and communication interface 116. A data bus may interconnect processor 114, memory 115, and communication interface 116. Communication interface 116 may be a network interface configured to support communication between recipient client device 103 and one or more networks (e.g., network 101, or the like). Memory 115 may include one or more program modules having instructions that when executed by processor 111 cause recipient client device 103 to perform one or more functions described herein and/or one or more databases that may store and/or otherwise maintain information which may be used by such program modules and/or processor 114. In some instances, the one or more program modules and/or databases may be stored by and/or maintained in different memory units of recipient client device 103 and/or by different computing devices that may form and/or otherwise make up recipient client device 103. For example, memory 115 may have, host, store, and/or include application host module 115a and/or application host database 115b.

Application host module 115a may have instructions that direct and/or cause recipient client device 103 to execute advanced techniques to provide enhanced threat detection for electronic messaging. Application host database 115b may store information used by application host module 115a and/or recipient client device 103 to provide enhanced threat detection for electronic messaging, and/or in performing other functions.

Figure 2B:
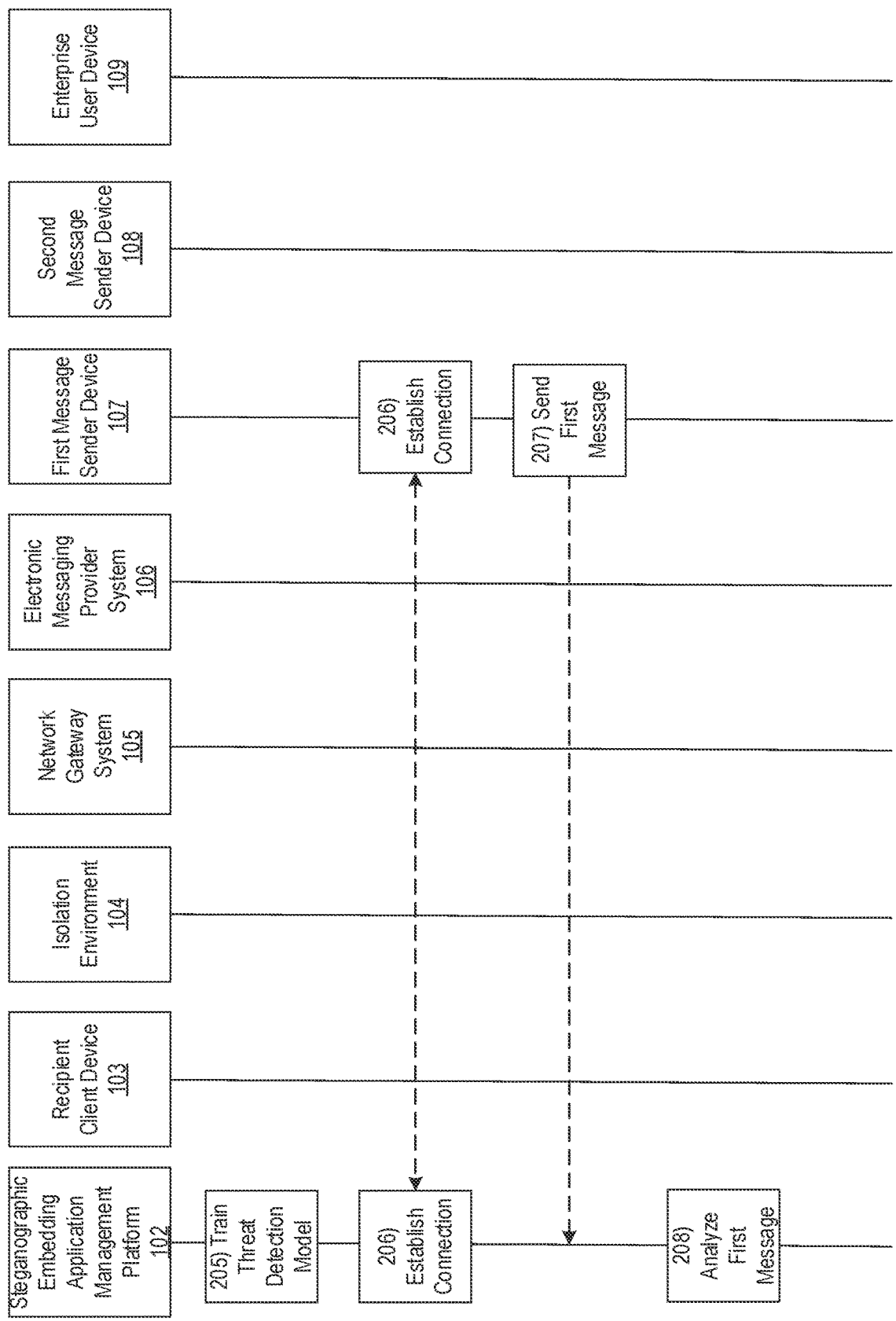

FIGS. 2A-2G depict an illustrative event sequence for improved electronic messaging security in accordance with one or more example embodiments. Referring to FIG. 2A, at step 201, the steganographic embedding application management platform 102 may configure an electronic messaging plugin. For example, the steganographic embedding application management platform 102 may configure the electronic messaging plugin to validate steganography embedded in electronic messages. In some instances, the electronic messaging plugin may be configured for integration with an email application, text messaging application, instant messaging application, and/or other communication based application.

At step 202, the steganographic embedding application management platform 102 may establish a connection with the recipient client device 103. For example, the steganographic embedding application management platform 102 may establish a first wireless data connection with the recipient client device 103 to link the steganographic embedding application management platform 102 to the recipient client device 103. In some instances, the steganographic embedding application management platform 102 may identify whether or not a connection is already established with the recipient client device 103. If a connection is already established with the recipient client device 103, the steganographic embedding application management platform 102 might not re-establish the connection. Otherwise, if a connection is not yet established with the recipient client device 103, the steganographic embedding application management platform 102 may establish the first wireless data connection as described herein.

At step 203, the steganographic embedding application management platform 102 may push the electronic messaging plugin to the recipient client device 103. In some instances, the steganographic embedding application management platform 102 may push the electronic messaging plugin to the recipient client device 103 via the communication interface 113 and while the first wireless data connection is established. In some instances, the steganographic embedding application management platform 102 may also send one or more commands directing the recipient client device 103 to install the electronic messaging plugin.

At step 204, the recipient client device 103 may install the electronic messaging plugin (e.g., based on or in response to the one or more commands from the steganographic embedding application management platform 102 directing the recipient client device 103 to install the electronic messaging plugin). For example, the recipient client device 103 may cause integration between the electronic messaging plugin and one or more of an email application, text messaging application, instant messaging application, and/or other communication based application.

Referring to FIG. 2B, at step 205, the steganographic embedding application management platform 102 may train a threat detection model using historical message threat information (which may, e.g., be received from internal databases and/or external sources). For example, the steganographic embedding application management platform 102 may train the threat detection model using IP addresses, times, text, images, and/or other message content corresponding to historical electronic messages for which a threat was identified. In some instances, in training the threat detection model, the steganographic embedding application management platform 102 may train a supervised machine learning model (e.g., decision trees, bagging, boosting, random forest, K-NN, linear regression, artificial neural network, logistic regression, support vector machine, and/or other supervised learning models), unsupervised machine learning model (e.g., classification, regression, clustering, anomaly detection, feature engineering, and/or other unsupervised machine learning model), and/or other model to output a threat score corresponding to a given message (e.g., based on comparison of characteristics of a new message to the message features upon which the threat detection model was trained).

At step 206, the first message sender device 107 may establish a connection with the steganographic embedding application management platform 102. For example, the first message sender device 107 may establish a second wireless data connection with the steganographic embedding application management platform 102 to link the first message sender device 106 with the steganographic embedding application management platform 102 (e.g., in preparation for sending messages). In some instances, the first message sender device 107 may identify whether or not a connection is already established with the steganographic embedding application management platform 102. If a connection is already established, the first message sender device 107 might not re-establish the connection. If a connection is not yet established, the first message sender device 107 may establish the second wireless data connection as described herein.

At step 207, the first message sender device 107 may send a first message to the steganographic embedding application management platform 102. For example, the first message may be intended for the recipient client device 103, but the steganographic embedding application management platform 102 may intercept the first message during transmission. In some instances, the first message sender device 107 may send the first message via the communication interface 116 and while the second wireless data connection is established. In some instances, in sending the first message, the first message sender device 107 may send an email, a text, a chat message, an instant message, and/or other type of message. In some instances, the first message may include one or more hyperlinks and/or other content. For illustrative purposes, it may be assumed that the first message sender device 107 is operated by a legitimate individual, and that the first message does not include malware or phishing content, and is not otherwise malicious (at least at the time of sending). For example, the first message sender device 107 may be operated by an employee of an enterprise organization corresponding to the steganographic embedding application management platform 102, and may be sending a message that includes internal and/or external links corresponding to the enterprise organization (e.g., to a client of the enterprise organization, other employee, and/or other individual).

At step 208, the steganographic embedding application management platform 102 may analyze the first message. For instance, the steganographic embedding application management platform 102 may input features of the first message into the threat detection model to identify a threat score for the first message. For example, the steganographic embedding application management platform 102 may compare IP addresses, times, text, images, and/or other message content of the first message to known threat indicators corresponding to historically malicious messages.

Once a threat score is generated, the steganographic embedding application management platform 102 may compare the threat score to a threat detection threshold. If the threat score meets or exceeds the threat detection threshold, the steganographic embedding application management platform 102 may identify that the first message corresponds to a known threat. In these instances, the steganographic embedding application management platform 102 may proceed to step 209. Otherwise, if the threat score does not meet or exceed the threat detection threshold, the steganographic embedding application management platform 102 may identify that the first message is legitimate, and may proceed to step 212.

In doing so, the steganographic embedding application management platform 102 may implement an initial tier of threat analysis, which may, e.g., quickly (and with minimal computing power) identify known threats so as to avoid embedding steganography into such messages identified as malicious.

Figure 2C:
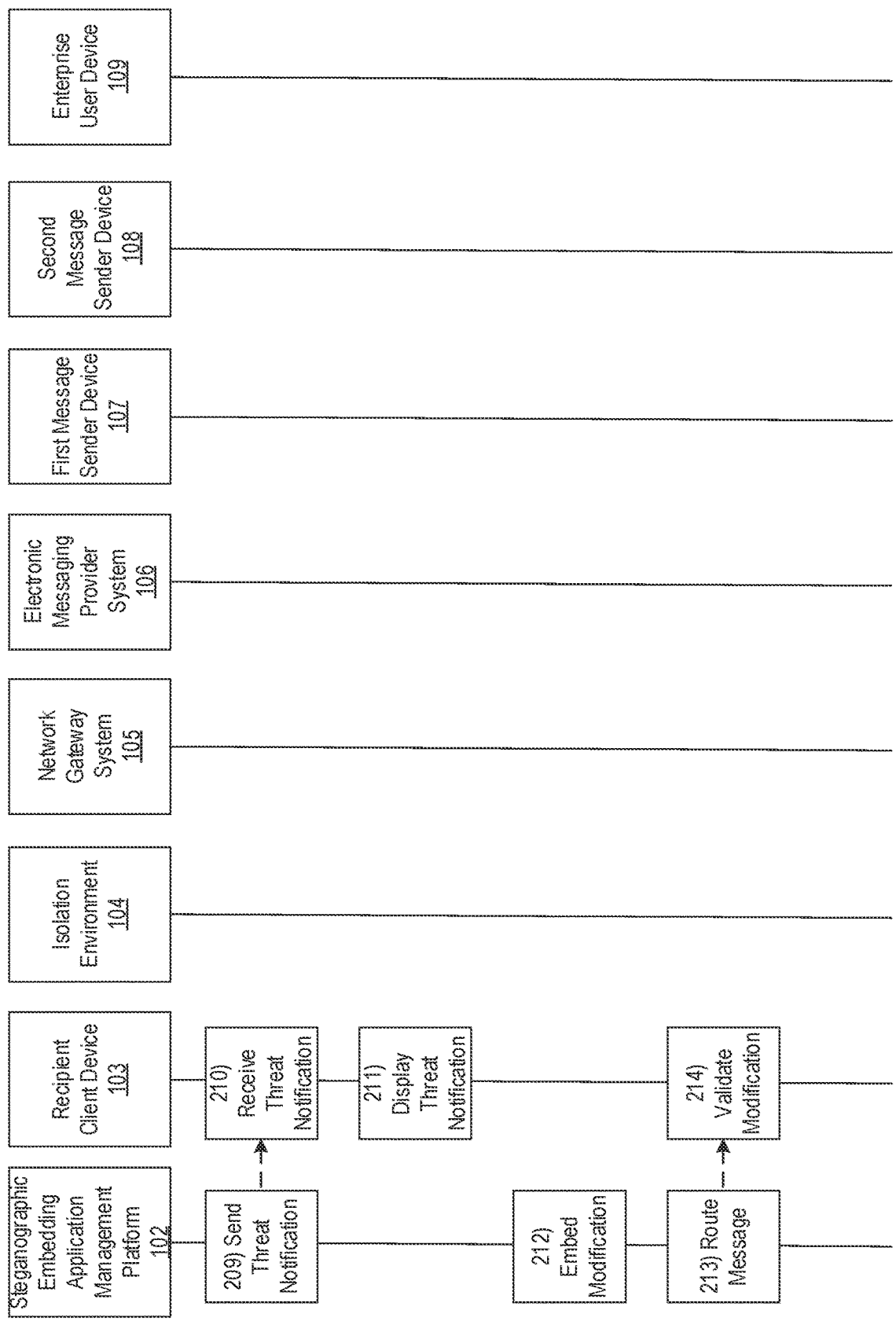

Referring to FIG. 2C, at step 209, the steganographic embedding application management platform 102 may send a threat notification to the recipient client device 103. For example, the steganographic embedding application management platform 102 may send a notification indicating that a malicious message was identified, and might not be delivered to the recipient client device 103. In some instances, the steganographic embedding application management platform 102 may also send one or more commands directing the steganographic embedding application management platform 102 to display the threat notification. In some instances, the steganographic embedding application management platform 102 may send the threat notification to the recipient client device 103 via the communication interface 113 and while the first wireless data connection is established.

At step 210, the recipient client device 103 may receive the threat notification sent at step 209. For example, the recipient client device 103 may receive the threat notification via the communication interface 116 and while the first wireless data connection is established. In some instances, the recipient client device 103 may also receive the one or more commands directing the recipient client device 103 to display the threat notification.

Figure 5:
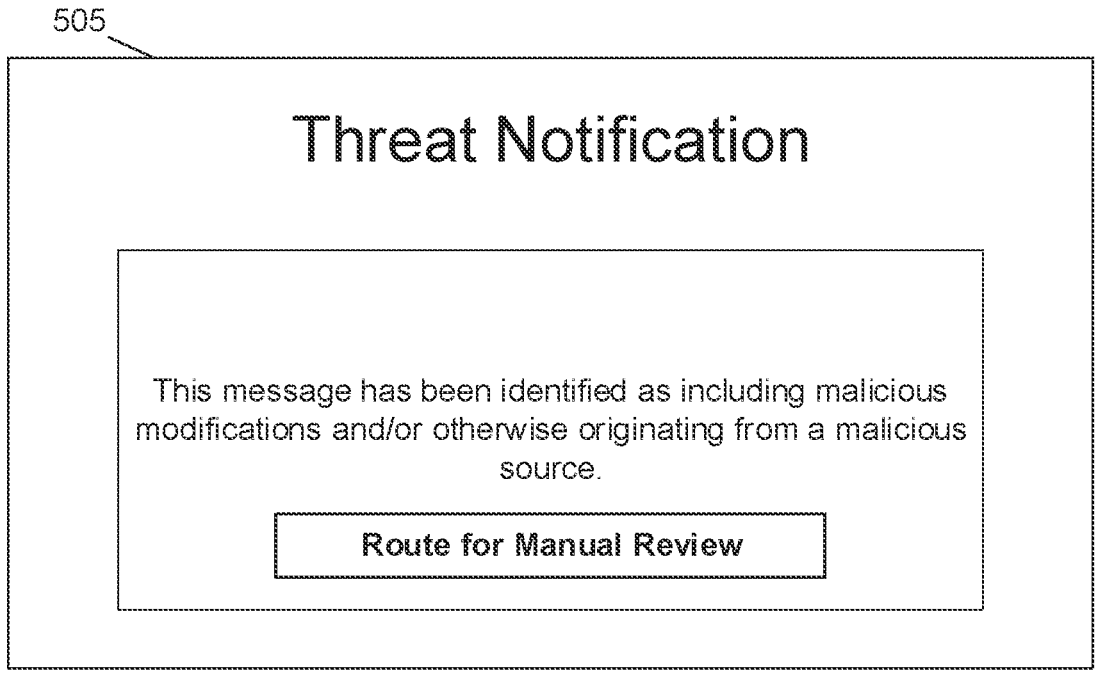
FIGS. 5 and 6 depict illustrative graphical user interfaces for improved electronic messaging security in accordance with one or more example embodiments.
Figure 6:
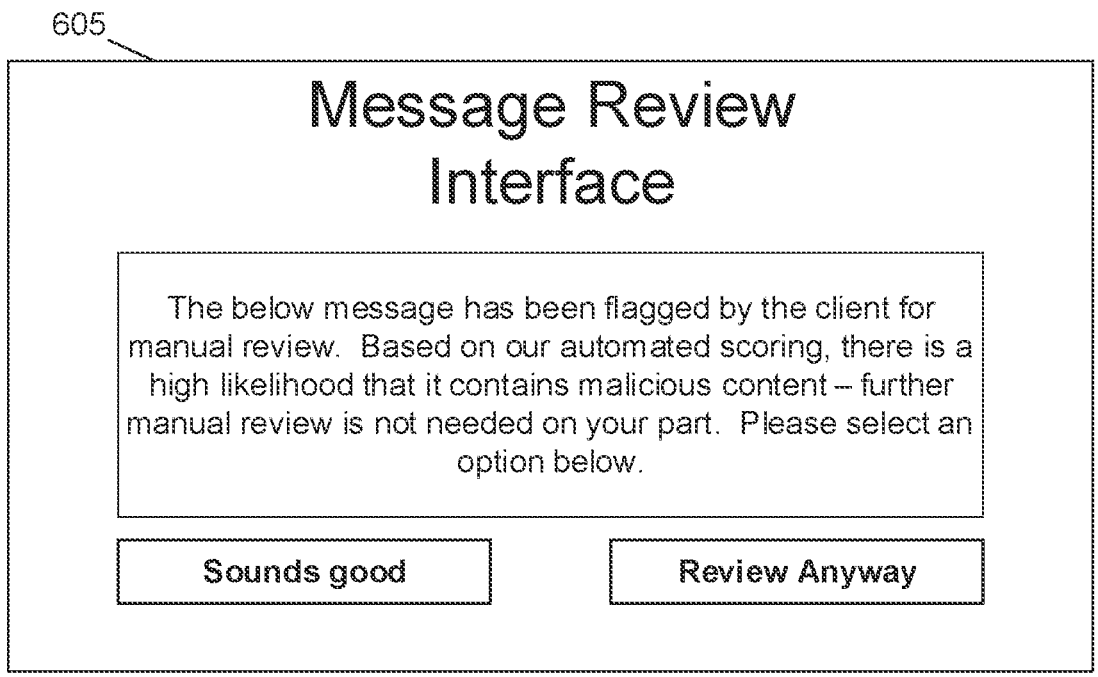

At step 211, based on or in response to the one or more commands directing the recipient client device 103 to display the threat notification, the recipient client device 103 may display the threat notification. For example, the recipient client device 103 may display a graphical user interface similar to graphical user interface 505, which is illustrated in FIG. 5. In addition or as an alternative to the actions performed at steps 209-211, further security actions may be performed as described in further detail below with regard to steps 227-229.

At step 212, the steganographic embedding application management platform 102 may generate a steganographic modification, and embed the steganographic modification into the first message. In some instances, in generating the steganographic modification, the steganographic embedding application management platform 102 may generate a unique modification for the first message. For example, the steganographic modification may be of a different type (e.g., text, image, logo, animation, timestamp, different length of characters, different format, and/or other type) than at least an immediately preceding steganographic modification (e.g., generated for a previous message). In some instances, the steganographic modification type may be selected using randomization, so as to continuously generate different types of modifications. In doing so, the steganographic embedding application management platform 102 may further complicate the process of successfully replicating the steganographic modification and/or predicting the correct steganographic modification (e.g., by a bad actor).

Once generated, the steganographic modification may be embedded into the first message by the steganographic embedding application management platform 102. In some instances, the steganographic embedding application management platform 102 may similarly randomize a location selection process, identifying a location within the message in which the steganographic modification is to be embedded (which may similarly be at least different than a location of the steganographic modification of an immediately preceding message). For example, the steganographic modification may be embedded into a randomized location within the first message, so as to even further complicate the process of successfully replicating the steganographic modification location and/or predicting the correct steganographic modification location.

Accordingly, to successfully replicate the steganographic modification, the content of the modification, the type of modification, and the location of the modification all must be correctly predicted in advance by a bad actor, which greatly reduces the chance of successful replication, and greatly increases the chances of threat detection. In some instances, embedding the steganographic modification into the first message might not have a visual impact on the first message itself (e.g., when viewed by a message recipient), but may be detectable using computing resources (e.g., the electronic messaging plugin).

At step 213, the steganographic embedding application management platform 102 may send the modified first message to the recipient client device 103. For example, the steganographic embedding application management platform 102 may send the modified first message to the recipient client device 103 via the communication interface 113 and while the first wireless data connection is established.

At step 214, the recipient client device 103 may validate the steganographic modification included in the first message. For example, the recipient client device 103 may utilize the electronic messaging plugin to communicate with the steganographic embedding application management platform 102 to obtain a source of truth for the steganographic modification included in the first message. Additionally or alternatively, the steganographic embedding application management platform 102 may make available (e.g., by sending in advance, granting access to a database, and/or otherwise) the source of truth to the recipient client device 103 by way of the electronic messaging plugin.

In these examples, the recipient client device 103 may use the electronic messaging plugin to compare the steganographic modification received within the first message to the source of truth. If the steganographic modification matches the source of truth, the recipient client device 103 may identify that the first message is legitimate. In these instances, the recipient client device 103 may proceed to step 215. If the steganographic modification does not match the source of truth, the recipient client device 103 may identify that the first message may have been maliciously modified. For example, the first message may have originated from a malicious source, which may have embedded incorrect steganography (e.g., wrong content, location, type, or the like) or may have failed to embed any steganography at all. Alternatively, the first message may have originated at a legitimate source, but may have been intercepted and maliciously modified in transmission, which may, e.g., affect the steganography embedded by the steganographic embedding application management platform 102. In these instances, the recipient client device 103 (and other illustrated computing devices) may perform actions similar to those described below with regard to step 218-230.

Figure 2D:
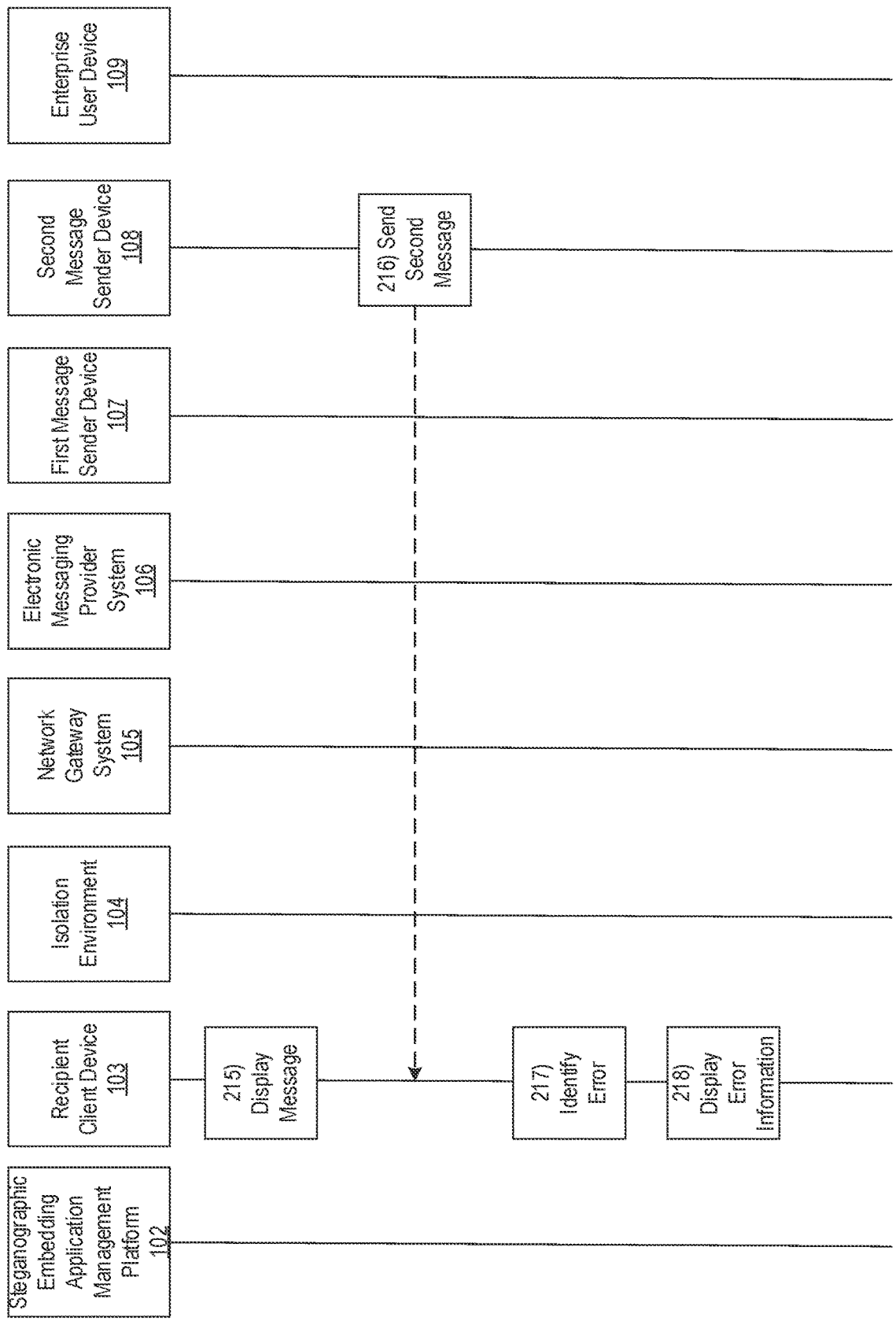

Referring to FIG. 2D, at step 215, the recipient client device 103 may display the first message. For example, the recipient client device 103 may display an email, text message, chat message, instant message, and/or other message on a display of the recipient client device 103.

At step 216, the second message sender device 108 may send a second message to the recipient client device 103 (and/or to the recipient client device 103 via an electronic messaging provider). For example, the second message sender device 108 may send a text message, email, chat message, instant message, and/or other message. For illustrative purposes, it may be assumed that the second message sender device 108 may be operated by a bad actor, who may, in some instances, be external to the enterprise organization corresponding to the steganographic embedding application management platform 102. Accordingly, the steganographic embedding application management platform 102 might not receive and/or otherwise intercept the second message prior to it reaching the recipient client device 103. As a result, the second message might not include a steganographic modification.

At step 217, the recipient client device 103 may use the electronic messaging plugin to attempt to validate a steganographic modification to the second message. In doing so, the recipient client device 103 may identify that the second message does not include a steganographic modification. Accordingly, the recipient client device 103 may identify that the second message cannot be validated and may include malicious content.

At step 218, the recipient client device 103 may display an error interface. For example, the recipient client device 103 may display a graphical user interface similar to graphical user interface 505, which is illustrated in FIG. 5. In some instances, the recipient client device 103 may display an option to route the second message for further review (e.g., if the user of the recipient client device 103 believes the threat notification to be in error). In some instances, in displaying the error notification, the recipient client device 103 may display the second message, but may obscure a hyperlink and/or other content identified as malicious (e.g., by removing this content, adding a new element over the content, flagging the content, disabling the content, and/or otherwise obscuring the content). In these instances, the recipient client device 103 may display, within the second message, that the obscured content has been identified as malicious. In other instances, the recipient client device 103 may prevent the user of the recipient client device 103 from accessing any portion of the second message.

Figure 2E:
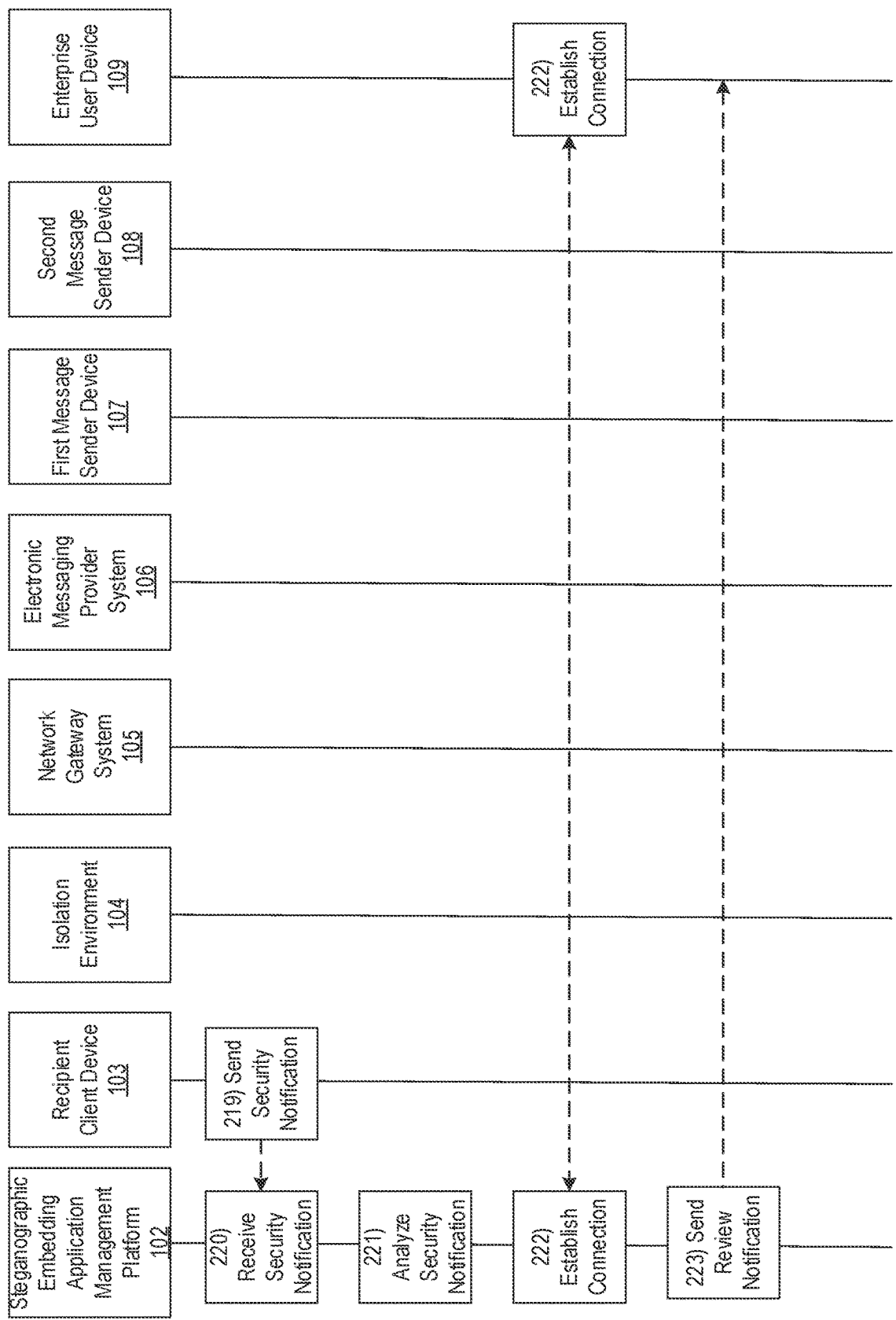

Referring to FIG. 2E, at step 219, the recipient client device 103 may also send a security notification to the steganographic embedding application management platform 102. For example, the recipient client device 103 may send the security notification via the communication interface 116 and while the first wireless data connection is established. In some instances, the security notification may include information corresponding to the second message (e.g., IP addresses, times, text, images, and/or other message content).

At step 220, the steganographic embedding application management platform 102 may receive the security notification sent at step 219. For example, the steganographic embedding application management platform 102 may receive the security notification via the communication interface 113 and while the first wireless data connection is established.

At step 221, the steganographic embedding application management platform 102 may analyze the second message (e.g., based on the information included in the security notification) using the threat detection model. For example, the steganographic embedding application management platform 102 may perform similar techniques as those described above with regard to step 208 to produce a threat score for the second message.

At step 222, the steganographic embedding application management platform 102 may establish a connection with the enterprise user device 109. For example, the steganographic embedding application management platform 102 may establish a third wireless data connection with the enterprise user device 109 to link the steganographic embedding application management platform 102 to the enterprise user device 109 (e.g., in preparation for sending manual review notifications). In some instances, the steganographic embedding application management platform 102 may identify whether or not a connection is already established with the enterprise user device 109. If a connection is already identified, the steganographic embedding application management platform 102 might not re-establish the connection. If a connection is not yet identified, the steganographic embedding application management platform 102 may establish the third wireless data connection as described herein.

At step 223, the steganographic embedding application management platform 102 may send a manual review notification (which may, in some instances, include the identified threat score for the second message) to the enterprise user device 109. In some instances, the steganographic embedding application management platform 102 may compare the threat score for the second message to a predetermined manual review threshold, and may provide a recommendation in the manual review notification accordingly. For example, if the threat score meets or exceeds the manual review threshold, the steganographic embedding application management platform 102 may include a recommendation that the second message has a high likelihood of including malicious content, and further manual review is not needed to determine whether or not the second message should be released to the recipient client device 103. If the threat score fails the manual review threshold, the steganographic embedding application management platform 102 may include a recommendation that the second message may be worth reviewing to identify whether or not it was flagged as a false positive. In doing so, the steganographic embedding application management platform 102 may conserve time and/or additional processing resources that would otherwise be used to conduct manual review of electronic messages known to be malicious.

In some instances, the steganographic embedding application management platform 102 may send the manual review notification to the enterprise user device 109 via the communication interface 113 and while the third wireless data connection is established. In some instances, the steganographic embedding application management platform 102 may also send one or more commands directing the enterprise user device 109 to display the manual review interface.

Referring to FIG. 2F, at step 224, based on or in response to the one or more commands directing the enterprise user device 109 to display the manual review interface, the enterprise user device 109 may display the manual review interface. For example, the enterprise user device 109 may display a graphical user interface similar to graphical user interface 109.

At step 225, the enterprise user device 109 may send review information (e.g., manual review findings, a user selection to proceed with security actions, and/or other information) back to the steganographic embedding application management platform 102. For example, the enterprise user device 109 may send the review information to the steganographic embedding application management platform 102 while the third wireless data connection is established.

At step 226, the steganographic embedding application management platform 102 may receive the review information. For example, the steganographic embedding application management platform 102 may receive the review information via the communication interface 113 and while the third wireless data connection is established. In instances where further manual review of the second message is not requested by the recipient client device 103, steps 222-226 might not be performed, and instead the steganographic embedding application management platform 102 may proceed from step 221 to step 227.

At step 227, the steganographic embedding application management platform 102 may direct one or more computing systems (e.g., isolation environment 104, network gateway system 105, electronic messaging provider system 106, and/or other systems) to execute one or more security actions. For example, the steganographic embedding application management platform 102 may direct the isolation environment 104 to further analyze (e.g., identify the sender, identify the steganography discrepancy, delete the message, and/or take other actions) the second message in an environment that may be disconnected from an enterprise and/or other network and thus may prevent malicious software and/or other content, included in the second message, from affecting such networks or their corresponding devices. Additionally or alternatively, the steganographic embedding application management platform 102 may direct the network gateway system 105 to modify one or more network routing and/or other policies so as to prevent further messages (e.g., from a corresponding IP address and/or otherwise) from reaching their target recipients. Additionally or alternatively, the steganographic embedding application management platform 102 may direct the electronic message provider system 106 (which may, e.g., be a third party electronic message provider) to update their corresponding security policies based on the second messages (e.g., flag and/or otherwise block messages from this sender, add the sender to a stored list of malicious domains, or the like).

At step 228, the one or more computing systems (e.g., isolation environment 104, network gateway system 105, electronic messaging provider system 106, and/or other systems) may receive the commands directing them to execute the one or more security actions. At step 229, based on or in response to the commands directing the one or more computing systems (e.g., isolation environment 104, network gateway system 105, electronic messaging provider system 106, and/or other systems) to execute one or more security actions, the computing systems (e.g., isolation environment 104, network gateway system 105, electronic messaging provider system 106, and/or other systems) may execute the corresponding security actions.

Referring to FIG. 2G, at step 230, the steganographic embedding application management platform 102 may update the threat detection model based on any new threat information identified with regard to the first and/or second message, and/or any manual review information received (e.g., feedback that a message was incorrectly flagged, or the like). For example, the steganographic embedding application management platform 102 may establish a dynamic feedback loop to continuously and iteratively refine the threat detection model so as to increase accuracy of the threat detection model in identifying message threats. In doing so, the steganographic embedding application management platform 102 may configure the threat detection model to pre-block instances of similar messages (e.g., originating at the same domain, source, and/or otherwise) using the threat detection model without wasting computing resources to embed steganography.

In some instances, the above described methods may be performed by enterprise computing systems corresponding to a particular enterprise organization. Additionally or alternatively, these methods may be provided to other organizations (e.g., email providers, other organizations, or the like) as a service.

Accordingly, by embedding steganography into known legitimate messages during transmission and comparing identified steganographic modifications to a known truth source at the time of receipt, security of the given messages may be ensured (e.g., as opposed to simply trusting an evaluation of a corresponding IP addresses and/or other sender details, which might not have been updated as recently). Furthermore, by embedding different the steganography using different content, content types, and locations, the steganography may be near impossible to accurately forge on behalf of a bad actor, thus increasing the effectiveness and accuracy of such a method in identifying malicious messages.

Figure 3:
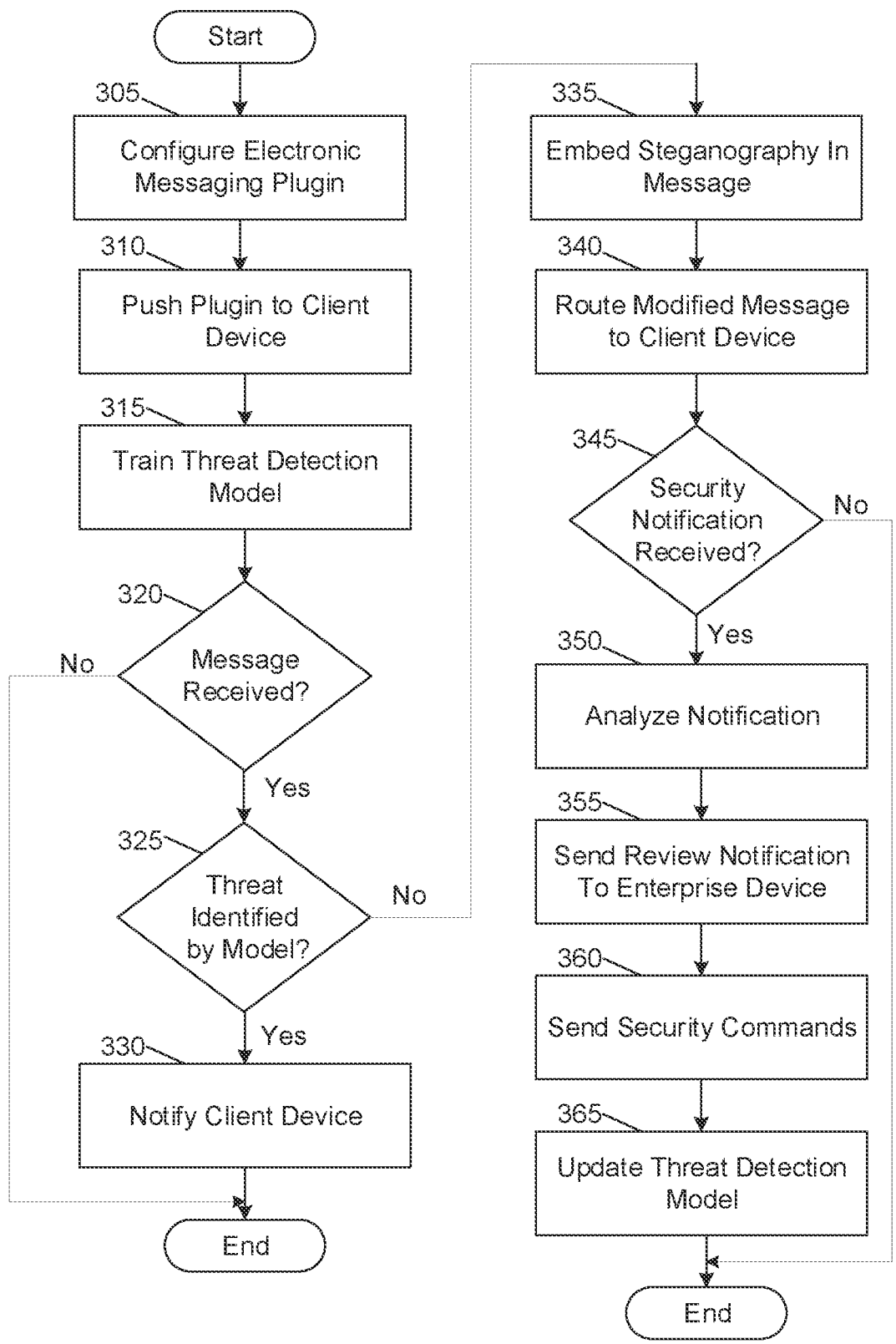
FIGS. 3 and 4 depict illustrative methods for improved electronic messaging security in accordance with one or more example embodiments.

FIG. 3 depicts an illustrative method for improved electronic messaging security in accordance with one or more example embodiments. Referring to FIG. 3, at step 305, a computing platform having at least one processor, a communication interface, and memory may configure an electronic messaging plugin. At step 310, the computing platform may push the plugin to a client device. At step 315, the computing platform may train a threat detection model. At step 320, the computing platform may identify whether or not a message has been received. If a message has not been received, the method may end. Otherwise, if a message has been received, the computing platform may proceed to step 325.

At step 325, the computing platform may analyze the message using the threat detection model. If a threat is identified, the computing platform may proceed to step 330. At step 330, the computing platform may send a notification of the threat to the client device.

Returning to step 325, if a threat is not identified, the computing platform may proceed to step 335. At step 335, the computing platform may embed steganography into the message. At step 340 the computing platform may route the modified message to the client device. At step 345, the computing platform may identify whether or not a security notification was received. If a security notification was not received, the method may end. Otherwise, if a security notification was received, the computing platform may proceed to step 350.

At step 350, the computing platform may analyze the security notification. At step 355, the computing platform may send the review notification to an enterprise device. At step 360, the computing platform may send one or more security commands to network devices. At step 365, the computing platform may update the threat detection model.

Figure 4:
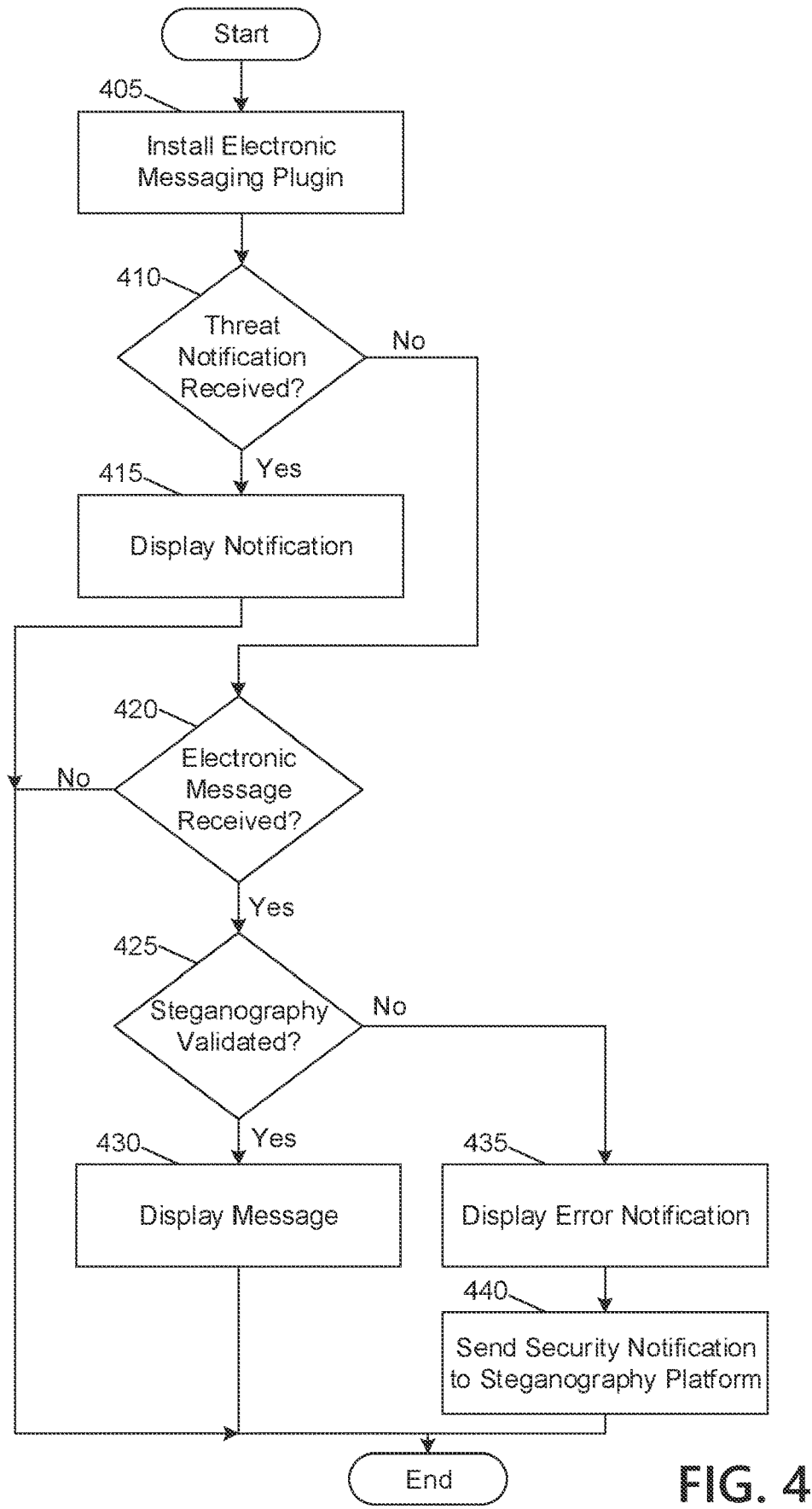

FIG. 4 depicts an illustrative method for improved electronic messaging security in accordance with one or more example embodiments. Referring to FIG. 4, at step 405, a computing platform having at least one processor, a communication interface, and memory may install an electronic messaging plugin. At step 410, the computing platform may identify whether a threat notification is received. If a threat notification is received, the computing platform may proceed to step 415. At step 415, the computing platform may display a threat notification, and the method may end.

Returning to step 410, if a threat notification is not received, the computing platform may proceed to step 420. At step 420, the computing platform may identify whether an electronic message is received. If an electronic message is not received, the method may end. Otherwise, the computing platform may proceed to step 425. At step 425, the computing platform may attempt to validate steganography in the electronic message. If the steganography is validated, the computing platform may proceed to step 430. At step 430, the computing platform may display the electronic message, and the method may end.

Returning to step 425, if the steganography is not validated, the computing platform may proceed to step 435. At step 435, the computing platform may display an error notification. At step 440, the computing platform may send a security notification to a steganographic embedding application management platform 102.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   push, to a client device, an electronic messaging plugin configured to validate steganographic modifications, embedded in electronic messages by the computing platform;
   intercept an electronic message directed to the client device;
   generate a steganographic modification to the electronic message, wherein generating the steganographic modification comprises generating a modification of a different type than a previously generated steganographic modification;
   embed, in the electronic message, the steganographic modification, resulting in a modified electronic message, wherein embedding the steganographic modification comprises embedding the steganographic modification in a location of the electronic message different than a location in which the previously generated steganographic modification was embedded in a previous message; and
   send, to the client device, the modified electronic message, wherein the client device is configured to validate, using the electronic messaging plugin, the steganographic modification prior to launching the modified electronic message at the client device.

2. The computing platform of claim 1, wherein the electronic message is intercepted from a computing device of an organization common between the computing platform and the computing device.

3. The computing platform of claim 1, wherein the steganographic modification corresponds to a modification type, and wherein the modification type comprises one or more of: an image, text, an animation, a timestamp, or a logo.

4. The computing platform of claim 1, wherein the steganographic modification comprises different characters than the previously generated steganographic modification.

5. The computing platform of claim 1, wherein the memory stores additional computer-readable instructions that, when executed by the one or more processors cause the computing platform to:
   store the steganographic modification, wherein the electronic messaging plugin is configured to access the stored steganographic modification to perform the validation.

6. The computing platform of claim 1, wherein the memory stores additional computer-readable instructions that, when executed by the one or more processors cause the computing platform to:
   train, using historical electronic messages, a machine learning model to identify whether or not the electronic messages comprise malicious messages, wherein generating the steganographic modification is in response to identifying, using the machine learning model, that the electronic message does not comprise a malicious message.

7. The computing platform of claim 1, wherein the memory stores additional computer-readable instructions that, when executed by the one or more processors cause the computing platform to:
receive, from the client device and via the electronic messaging plugin, a notification that the steganographic modification was not validated; and
send one or more network security commands directing one or more computing systems to execute network security actions.

8. The computing platform of claim 7, wherein the one or more computing systems comprise one or more of: a network gateway system, isolation environment, or electronic messaging provider system, and wherein the one or more actions comprise: identifying a source of the electronic message, identifying an edit to the steganographic modification, modifying a network routing policy, or updating a domain list.

9. The computing platform of claim 7, wherein the memory stores additional computer-readable instructions that, when executed by the one or more processors cause the computing platform to:
update, based on the notification that the steganographic modification was not validated, a machine learning model configured to identify whether or not the electronic messages comprise malicious messages.

10. The computing platform of claim 7, wherein a link within the electronic message is obscured based on the failed validation of the steganographic modification.

11. A method comprising:
at a computing platform comprising at least one processor, a communication interface, and memory:
pushing, to a client device, an electronic messaging plugin configured to validate steganographic modifications, embedded in electronic messages by the computing platform;
intercepting an electronic message directed to the client device;
generating a steganographic modification to the electronic message, wherein generating the steganographic modification comprises generating a modification of a different type than a previously generated steganographic modification;
embedding, in the electronic message, the steganographic modification, resulting in a modified electronic message, wherein embedding the steganographic modification comprises embedding the steganographic modification in location of the electronic message different than a location in which the previously generated steganographic modification was embedded in a previous message; and
sending, to the client device, the modified electronic message, wherein the client device is configured to validate, using the electronic messaging plugin, the steganographic modification prior to launching the modified electronic message at the client device.

12. The method of claim 11, wherein the electronic message is intercepted from a computing device of an organization common between the computing platform and the computing device.

13. The method of claim 11, wherein the steganographic modification corresponds to a modification type, and wherein the modification type comprises one or more of: an image, text, an animation, a timestamp, or a logo.

14. The method of claim 11, wherein the steganographic modification comprises different characters than the previously generated steganographic modification.

15. The method of claim 11, further comprising:
storing the steganographic modification, wherein the electronic messaging plugin is configured to access the stored steganographic modification to perform the validation.

16. The method of claim 11, further comprising:
training, using historical electronic messages, a machine learning model to identify whether or not the electronic messages comprise malicious messages, wherein generating the steganographic modification is in response to identifying, using the machine learning model, that the electronic message does not comprise a malicious message.

17. The method of claim 11, further comprising:
receiving, from the client device and via the electronic messaging plugin, a notification that the steganographic modification was not validated; and
sending one or more network security commands directing one or more computing systems to execute network security actions.

18. The method of claim 17, wherein the one or more computing systems comprise one or more of: a network gateway system, isolation environment, or electronic messaging provider system, and wherein the one or more actions comprise: identifying a source of the electronic message, identifying an edit to the steganographic modification, modifying a network routing policy, or updating a domain list.

19. The method of claim 17, further comprising:
updating, based on the notification that the steganographic modification was not validated, a machine learning model configured to identify whether or not the electronic messages comprise malicious messages.

20. One or more non-transitory computer-readable media storing instructions that, when executed by a computing platform comprising at least one processor, a communication interface, and memory, cause the computing platform to:
push, to a client device, an electronic messaging plugin configured to validate steganographic modifications, embedded in electronic messages by the computing platform;
intercept an electronic message directed to the client device;
generate a steganographic modification to the electronic message, wherein generating the steganographic modification comprises generating a modification of a different type than a previously generated steganographic modification;
embed, in the electronic message, the steganographic modification, resulting in a modified electronic message, wherein embedding the steganographic modification comprises embedding the steganographic modification in location of the electronic message different than a location in which the previously generated steganographic modification was embedded in a previous message; and
send, to the client device, the modified electronic message, wherein the client device is configured to validate, using the electronic messaging plugin, the steganographic modification prior to launching the modified electronic message at the client device.

* * * * *